(12) United States Patent
Kelley

(10) Patent No.: US 6,526,524 B1
(45) Date of Patent: Feb. 25, 2003

(54) WEB BROWSER PROGRAM FEEDBACK SYSTEM

(75) Inventor: Edward E. Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/408,356

(22) Filed: Sep. 29, 1999

(51) Int. Cl.[7] .................................................. H02H 3/05
(52) U.S. Cl. .............................. 714/38; 714/4; 714/57; 370/235
(58) Field of Search ................................. 714/38, 4, 11, 714/16, 26, 31, 47, 48, 57, 718, 820; 711/114; 348/192; 701/114; 370/216, 235; 706/909

(56) References Cited

U.S. PATENT DOCUMENTS

| | | | |
|---|---|---|---|
| 5,129,082 A | | 7/1992 | Tirfing et al. |
| 5,287,505 A | * | 2/1994 | Calvert et al. ................. 707/10 |
| 5,539,877 A | * | 7/1996 | Winokur et al. .............. 714/25 |
| 5,544,077 A | * | 8/1996 | Hershey ..................... 702/186 |
| 5,732,219 A | | 3/1998 | Blumer et al. |
| 5,734,831 A | | 3/1998 | Sanders |
| 5,740,430 A | | 4/1998 | Rosenberg et al. |
| 5,809,250 A | | 9/1998 | Kisor |
| 5,813,007 A | | 9/1998 | Nielsen |
| 5,815,708 A | | 9/1998 | Kessler et al. |
| 5,859,964 A | | 1/1999 | Wang et al. |
| 5,875,296 A | | 2/1999 | Shi et al. |
| 5,878,326 A | * | 3/1999 | Benz et al. ................. 340/7.52 |
| 5,884,073 A | | 3/1999 | Dent |
| 5,884,312 A | | 3/1999 | Dustan et al. |

* cited by examiner

Primary Examiner—Robert Beausoliel
Assistant Examiner—Rita A Ziemer
(74) Attorney, Agent, or Firm—DeLio & Peterson LLC; Peter W. Peterson; Jay H. Anderson

(57) ABSTRACT

A method and apparatus for providing feedback to a programmer of a web based application notifying the programmer of application errors encountered by an end user of the application. A user error table is created to log application errors when a user computer is running the web based application. The present invention searches the user error table to determine whether an application error has occurred and only those errors which occur for a first time are forwarded to a server responsible for collecting the programmer's e-mail. A server error table is created to log those error messages received by the server and only those error messages which are unique are forwarded to the programmer. The programmer does not receive duplicate error messages relating to the same error and can use the feedback provided by the present invention to correct the application in subsequent versions. Error messages are filtered at the user computer level and at the server level such that the programmer will receive error messages for a particular programming error only once. The programmer is not inundated with multiple error messages relating to the same error by multiple users. Most preferably, the present invention is a computer program product incorporating known source code containing the means for providing feedback to the programmer of application errors stored on a server accessible to users who can download the application onto their user computers.

25 Claims, 4 Drawing Sheets

User Error Table

| Application Name | Error Number | Error Message | Server Address |
|---|---|---|---|
| PGM001 | E005 | unknow variable | 9.50.70.05 |
| PGM002 | E006 | overflow condition | 9.60.75.08 |

FIG. 4

Server Error Table

| Application Name | Error Number | Error Message |
|---|---|---|
| PGM001 | E005 | unknow variable |
| PGM002 | E006 | overflow condition |

FIG. 5

Server Program Table

| Application Name | Programmer | Programmer E-mail Address |
|---|---|---|
| PGM001 | John Doe | doej@organization.com |
| PGM002 | Pat Kelley | kelleyp@company.com |

FIG. 6

WEB BROWSER PROGRAM FEEDBACK SYSTEM

BACKGROUND OF THE INVENTION

1. Field of the Invention

This invention relates to a method and apparatus for providing feedback to a programmer of application errors encountered by users of the application such that the programmer is not inundated with duplicate error messages.

2. Description of Related Art

When writing software applications, computer programmers realize that their application may not run properly. To determine at what point in the program source code the application fails, error messages are incorporated into the source code. Prior to launching the software in the market place, the programmer attempts to de-bug the application as much as possible. Once the software has reached the end user, certain errors may occur much more frequently than anticipated or a program within the application may not run as smoothly as possible, amongst other problems.

However, the programmer may not be aware of the errors encountered by the countless number of end users. Simply notifying the programmer of a programming error can be difficult to manage. Particularly in the context of web based applications, e.g., web sites, homepages, a web site may potentially encounter thousands of users a day. If a system simply notified the programmer of an error, there would be innumerable identical error messages sent to the programmer. Thus, it would be beneficial to provide a way to filter the error messages to the programmer thereby providing only significant feedback to the programmer.

Bearing in mind the problems and deficiencies of the prior art, it is therefore an object of the present invention to provide a method and apparatus for providing only significant feedback to a programmer regarding programming errors encountered by the end user.

It is another object of the present invention to provide a method and apparatus for notifying a programmer of programming errors that are not related to application and user computer compatibility.

A further object of the invention is to provide a method and apparatus for providing only significant feedback to a programmer regarding programming errors in web based applications.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method for notifying a programmer of an application error while running an application developed by the programmer, the application being stored on a user computer connected to a server on a network, the method comprising the steps of: (a) detecting an error while running an application; (b) determining whether the error has previously occurred while running the application; (c) sending an error message without user input to a server responsible for collecting error messages if the error has not previously occurred, the error message notifying the programmer of the application of the error; (d) receiving the error message by the server; (e) determining whether the error is recorded in a server error table stored on the server; and (f) sending an error message to the programmer if the error is not found on the server error table, the error message notifying the programmer of the error.

Preferably, the method may further include the step of creating a user error table and wherein step (b) further comprises determining whether the error has been recorded in the user error table. Upon determining that the error has been recorded in the user error table, the error message is not sent to the programmer. During step (e), if the error is recorded in the server error table, the error message is not sent to the programmer.

In another aspect, the present invention is directed to a method of notifying a programmer of an application error while a user is viewing a web application developed by the programmer on a user computer using a web browser linked to a server, the method comprising the steps of: (a) determining whether the web browser and the web application are compatible; (b) determining whether an error has previously occurred while viewing the web application; and (c) upon determining that the error has not previously occurred, sending an error message to the programmer via the server without user input to notify the programmer of the error. Preferably, in step (a), if the web browser and the web application are incompatible, an error message will not be generated. The method may further include the step of creating a user error table comprising a web application name, an error message, and an e-mail address for the programmer of the web application. Preferably, step (b) further includes the step of determining whether the error has been recorded in the user error table and, if the error has not been recorded, then continuing to step (c). Preferably, during step (c) the error message is sent to a server having a server error table for logging and filtering error messages.

The method may further include the step of determining whether the error message was previously recorded in the server error table, and if the error message is not recorded in the server error table, the error message is forwarded to the programmer. Conversely, if the error message is recorded in the server error table, the error message is not sent to the programmer. The method may further include the step of receiving an error message by the programmer regarding an application error wherein subsequent error messages have been filtered out by the user computer and the server such that duplicate error messages are not sent to the programmer. If there is no programmer indicated in the server program table, the error message may be sent to a server administrator or system programmer for the server. The method may further include the step of creating a server program table stored on the server comprising an application name and a programmer of the application.

In yet another aspect, the present invention is directed to a feedback system for alerting a programmer of an application error when a user is accessing a web application written by the programmer using a web browser, the system to perform the steps of: (a) determining whether an application error has previously occurred; (b) creating an error table stored on the user's computer; (c) searching the error table for the application error; (d) sending an error message corresponding to the application error to a server which collects e-mail for the programmer if the application error is not found in the error table; (e) creating a server error table stored on the server which collects e-mail for the programmer; (f) searching the server error table for the error message corresponding to the application error; and (g) forwarding the error message corresponding to the application error to the programmer when the error message is not found in the server error table.

Preferably, step (b) comprises creating an error table comprising entries for the web application, an error number, an error message, and an e-mail address of the programmer. Preferably, step (e) comprises creating a server error table comprising entries for the web application, an error number, and an error message. Most preferably, in step (g) the error message has been filtered by the user computer and the server which collects e-mail for the programmer such that the programmer does not receive multiple error messages relating to a same application error encountered by numerous different users.

In yet another aspect, the present invention is directed to a web browser stored on a user computer for accessing and browsing web applications, the user computer having stored thereon a user error table which tracks errors that occur while browsing a web application, the web browser comprising means for determining whether a web application error has occurred; means for creating an entry in the user error table corresponding to the web application error; means for searching the user error table to determine whether the web application error exists in the user error table prior to notifying the programmer of the web application error; and means for sending an error message to a server which collects e-mail for the programmer to notify the programmer of the web application error, the server having a server error table and a means for searching the server error table for the error message such that the programmer does not receive multiple error messages related to the web application error if said web application error exists in said server error table.

In still yet another aspect, the present invention is directed to a server within a network of user computers, each user computer capable of accessing an application written by a programmer and stored on the server, the server capable of logging and filtering application error messages for sending to the programmer to notify the programmer of application errors, comprising means for creating a server error table, the server error table stored on a memory storage of the server; means for creating and writing to a user error table on a user computer, the user error table comprising entries corresponding to the application written by the programmer, an error message and an address of the server; means for determining whether an application error has occurred; means for determining whether,an entry for an application error exists in the user error table; means for sending an error message by the user computer to the server regarding the application error, the error message sent without input from a user of the user computer; means for receiving the error message; means for determining whether the error message exists in the server error table; and means for sending an e-mail to the programmer if the error message is absent from the server error table.

In a further aspect, the present invention is directed to a program storage device readable by a machine, tangibly embodying a program of instructions executable by the machine to perform method steps for a method of notifying a programmer of an application error while running an application developed by the programmer, the application being stored on a user computer connected to a server on a network, the method steps comprising (a) detecting an error while running an application; (b) determining whether the error has previously occurred while running the application; (c) sending an error message without user input to a server responsible for collecting error messages if the error has not previously occurred, the error message notifying the programmer of the application of the error;(d) receiving the error message by the server; (e) determining whether the error is recorded in a server error table stored on a server; and (f) sending an error message to the programmer if the error is not found on the server error table, the error message notifying the programmer of the error.

In yet a further aspect, the present invention is directed to a program storage device readable by a machine, tangibly embodying a program of instructions executable by the machine to perform method steps for a method of providing feedback to a programmer regarding application errors while an application is running on a user computer linked to a server or network, the method steps comprising (a) creating a user error table stored on the user computer, the user error table containing entries for the application name, an error number, an error message, and a programmer's server e-mail address; (b) determining whether an application error has previously occurred by searching the user error table; (c) sending an e-mail to the programmer's server with an error message corresponding to the application error without input from a user of the user computer, the programmer's server having a server error table containing entries comprising an application name, an error number, and the error message; (d) receiving, by the programmer's server, the e-mail sent from the user computer; (e) determining whether the error message exists in the server error table; and (f) sending an e-mail to the programmer only if the error message did not exist in the server error table to apprise the programmer of the application error.

In still yet a further aspect, the present invention is directed to a computer program product comprising a computer usable medium having computer readable program code means embedded therein for causing application errors to be logged and filtered for forwarding to a programmer of an application, the computer readable program code means in the computer program product comprising computer readable program code means for causing a computer to detect an error while running the application; computer readable program code means for causing a computer to determine whether the error has previously occurred while running the application; computer readable program code means for causing a computer to send an error message without input from a user of the application to a server responsible for collecting e-mail for the programmer if the error has not previously occurred, the error message notifying the programmer of the application of the error; computer readable program code means for causing a computer to receive the e-mail by the server; computer readable program code means for causing a computer to determine whether the error is recorded in a server error table stored on the server; and computer readable program code means for causing a computer to send an e-mail to the programmer if the error is not found on the server error table, the error message notifying the programmer of the error.

In a final aspect, the present invention is directed to a computer program product comprising a computer usable medium having computer readable program code means embedded therein for causing applications errors to be logged and filtered such that a programmer of an application obtains feedback regarding the application errors, the computer readable program code means in the computer program product comprising computer readable program code means for causing a computer to create a user error table stored on the user computer, the user error table containing entries for applications stored on the user computer, an error number, an error message, and a programmer's server e-mail address; computer readable program code means for causing a computer to determine whether an application error has previously occurred by searching the user error table; computer readable program code means for causing a computer to send an e-mail to the programmer's server with an error message corresponding to the application error without input from a user of the user computer, the programmer's server having a server error table containing entries comprising an application name, an error number, and the error message; computer readable program code means for causing a computer to receive, by the programmer's server, the e-mail sent from the user computer; computer readable program code means for causing a computer to determine whether the error message has been previously received by the programmer's server; and computer readable program code means for causing a computer to send an e-mail to the programmer only if the error message was not previously received by the programmer's server to apprise the programmer of the application error.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 is a schematic representation of a user error table of the present invention.

FIG. 5 is a schematic representation of a server error table of the present invention.

FIG. 6 is a schematic representation of a server program table of the present invention.

DESCRIPTION OF THE PREFERRED EMBODIMENT(S)

Figure 1:
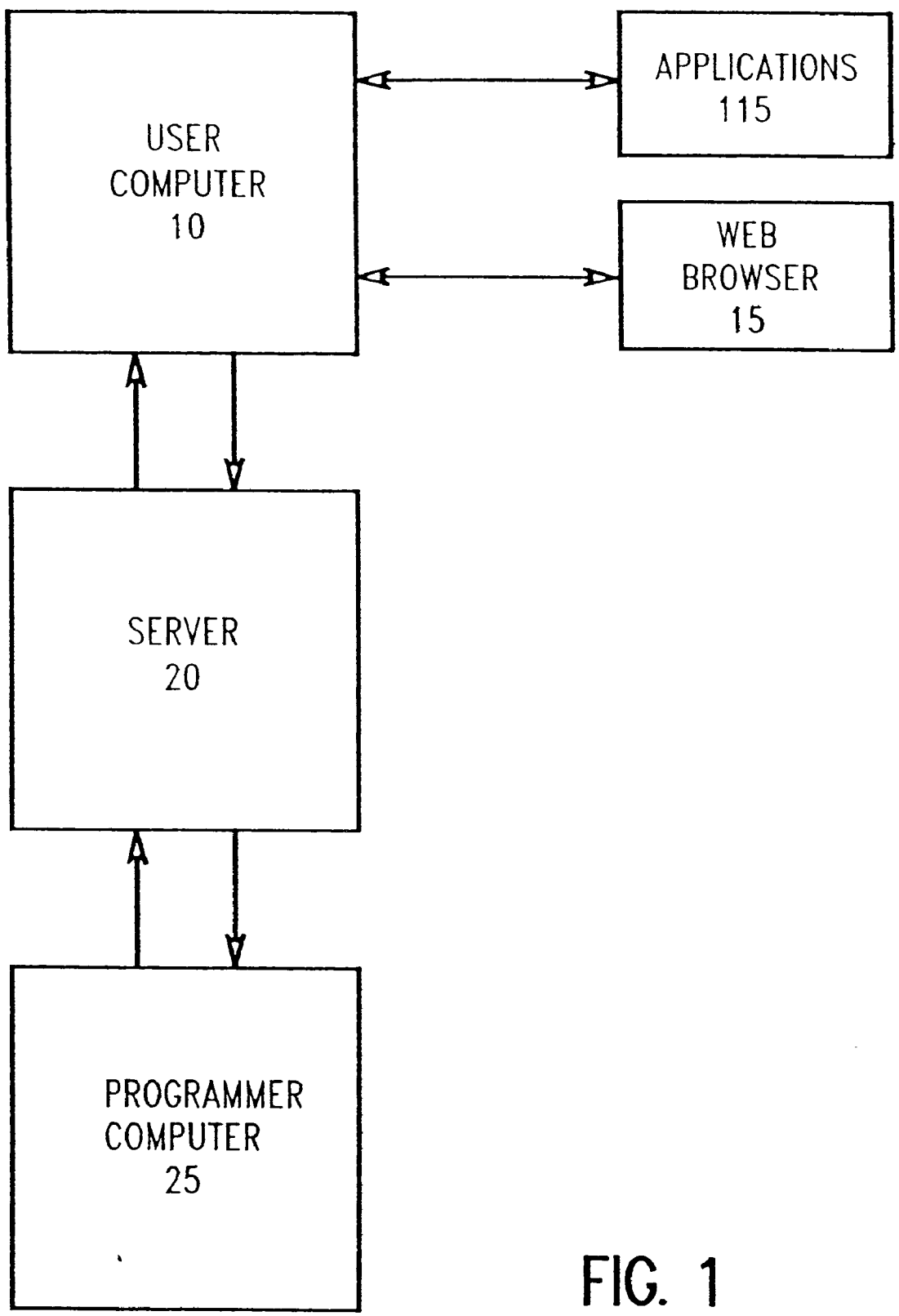
FIG. 1 is a schematic representation of a system that may be used to practice the present invention.

In describing the preferred embodiment of the present invention, reference will be made herein to FIGS. 1–6 of the drawings in which like numerals refer to like features of the invention. Features of the invention are not necessarily shown to scale in the drawings.

The present invention provides a method and apparatus for notifying the programmer of a script or application of a programming error encountered by a user of the script or application. Since the number of error messages are no doubt repeated when a large number of users are running the particular application, the present invention minimizes the number of error messages that are sent to the programmer such that the programmer is not inundated with messages relating to the same error over and over again. By first filtering the error messages at the user computer level and again at the server level, duplicate messages are not sent to the programmer. Additionally, the present invention will also determine whether the script or application error is caused by an incompatible version of the platform or web browser used by the user to run the particular application and an error message will not be sent. Thus, the present invention provides a method and system for logging and filtering error messages for the script or application at both the user and server levels such that the programmer will receive only one error message for each application error for each application version.

On a broad scale, the present invention may be used to log and filter error messages for applications on the user computer with external access to send error messages to the programmer of the application. Preferably, the present invention ideally provides feedback to a programmer of a web based application regarding errors which occur not as a result of incompatible application and browser versions, but programming errors. The present invention may be used as a "plug-in" (a file containing data used to alter, enhance, or extend the operation of a parent application program) on a user computer or a server, or incorporated into a web browser.

In FIG. 1, an information system typically includes one computer system such as a server 20 that makes information available so that other computer systems such as a user computer 10 or programmer computer 25 can access the information. The server 20 and computers 10 and 25 communicate via messages using a communication protocol sent over a communication channel such as a computer network, e.g. the Internet, or through a dial-up connection, e.g. ISDN line. The user computer 10 can run programs and/or applications 115 stored on its hard drive or on server 20, or engage web browser 15 to view documents located on the Internet or World Wide Web. Programmer computer 25 is similarly linked to server 20. As server 20 filters the error messages, only those messages that have been detected for the first time will be sent to the application programmer. The programmer may then access the feedback provided by the application users via server 20 by engaging programmer computer 25. Of course, the programmer may also access server 20 from a location other than programmer computer 25 as needed. User computer 10, server 20 and programmer computer 25 are capable of utilizing program storage devices embodying machine readable program code which cause the computers to perform the method steps of the present invention. Program storage devices include, but are not limited to, magnetic diskettes, magnetic tapes, optical disks, Read Only Memory (ROM), floppy disks, magnetic tape, semiconductor chips and the like. The program storage devices of the present invention may be devised, made and used as a component of a machine utilizing optics, magnetic properties and/or electronics to perform the method steps of the present invention.

Figure 2:
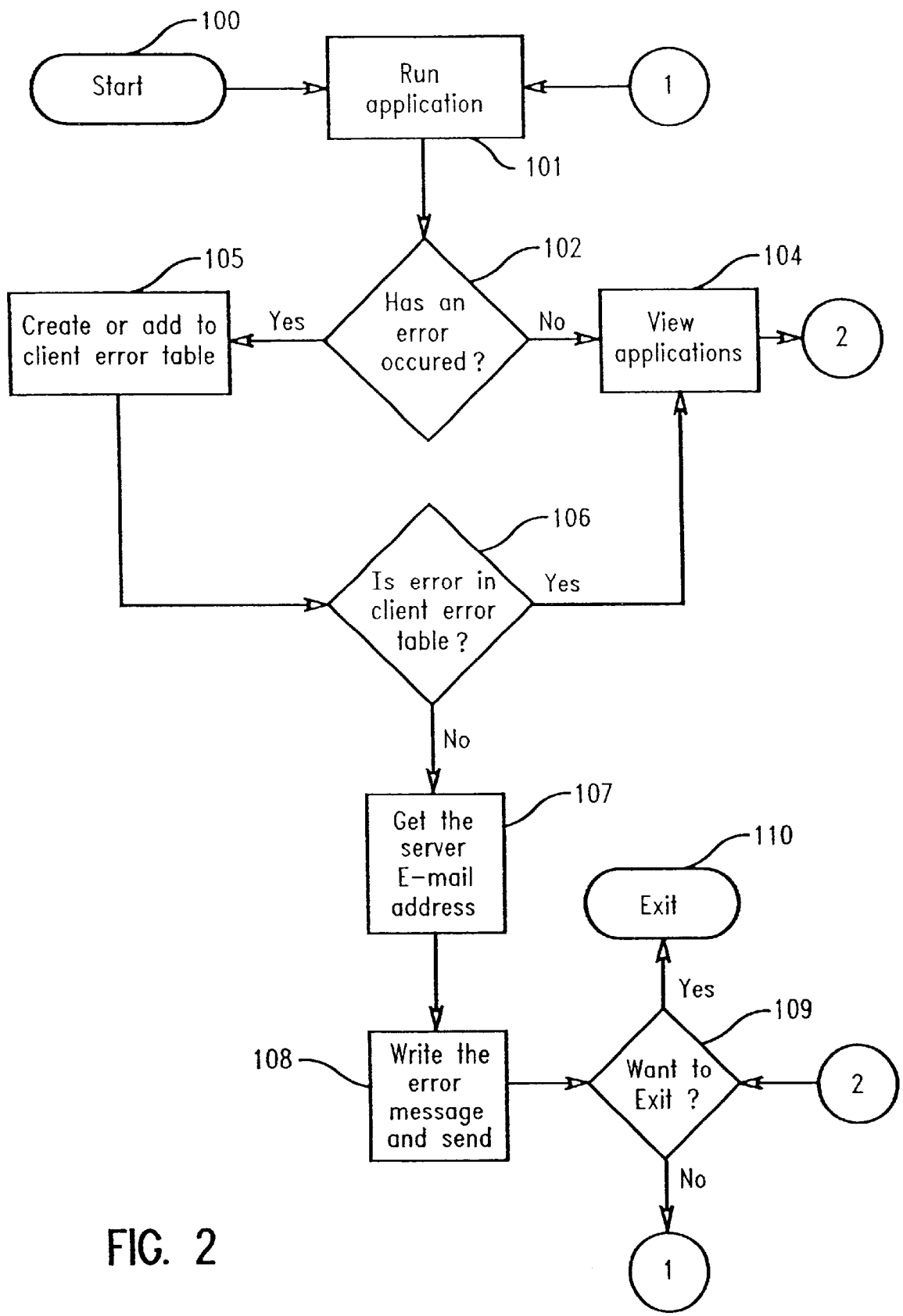
FIG. 2 is a flow diagram depicting the method steps of the present invention at the user computer interface.

Whether the process of the present invention is utilized as a "plug-in" or incorporated into a web browser of the present invention, the following example is described with respect to web based applications. In FIG. 2, the process is initiated 100 when a user engages a web browser on the user computer to access and run applications 101 selected by the user. As the application is running, it is determined whether an error has occurred 102. If no error has occurred, the selected application continues to run or display 104 information to the user for viewing. Preferably, the present invention determines whether the error is caused by an incompatible version of the web browser being used to run the selected application by checking the browser version installed on the user computer and comparing it with the acceptable browser version accompanying the application. If the error stems from incompatibility between the browser and application, an error message is not generated since this is not an application error of which the programmer should be apprised.

However, in the event that an error has occurred, an error message corresponding to the error is issued. The present invention creates or adds to a user error table 105 stored on the user computer memory storage, as illustrated in FIG. 4, comprising entries for the particular application name, the error number that uniquely identifies the error, the error message, and a server e-mail address for the programmer. Once the error has occurred, the user error table is searched 106 to determine whether the error exists in the user error table. If the error has occurred previously and an entry exists in the user error table for the specific error, the programmer will not be notified of this occurrence since a prior error message would have been sent earlier. The selected application continues to run or display 104 information to the user for viewing if possible.

Upon a first occurrence of an error, the programmer's server e-mail address is obtained from the user error table 107. An error message is written 108 comprising of the application name, the error number and/or error message along with the e-mail address of the server responsible for collecting the programmer's e-mail. The completed error message is sent to the server indicated in the user error.table without input from the user. Thus, once the error message has been sent to the server, the next step 109 is to determine whether to exit the process 110 or run another application 101.

Therefore, at the user computer level described above, the same errors which occur when running an application are logged in the user error table and only first occurrences of any errors are forwarded onto server 20 or any other server responsible for collecting the programmer's e-mail for further error screening.

Figure 3:
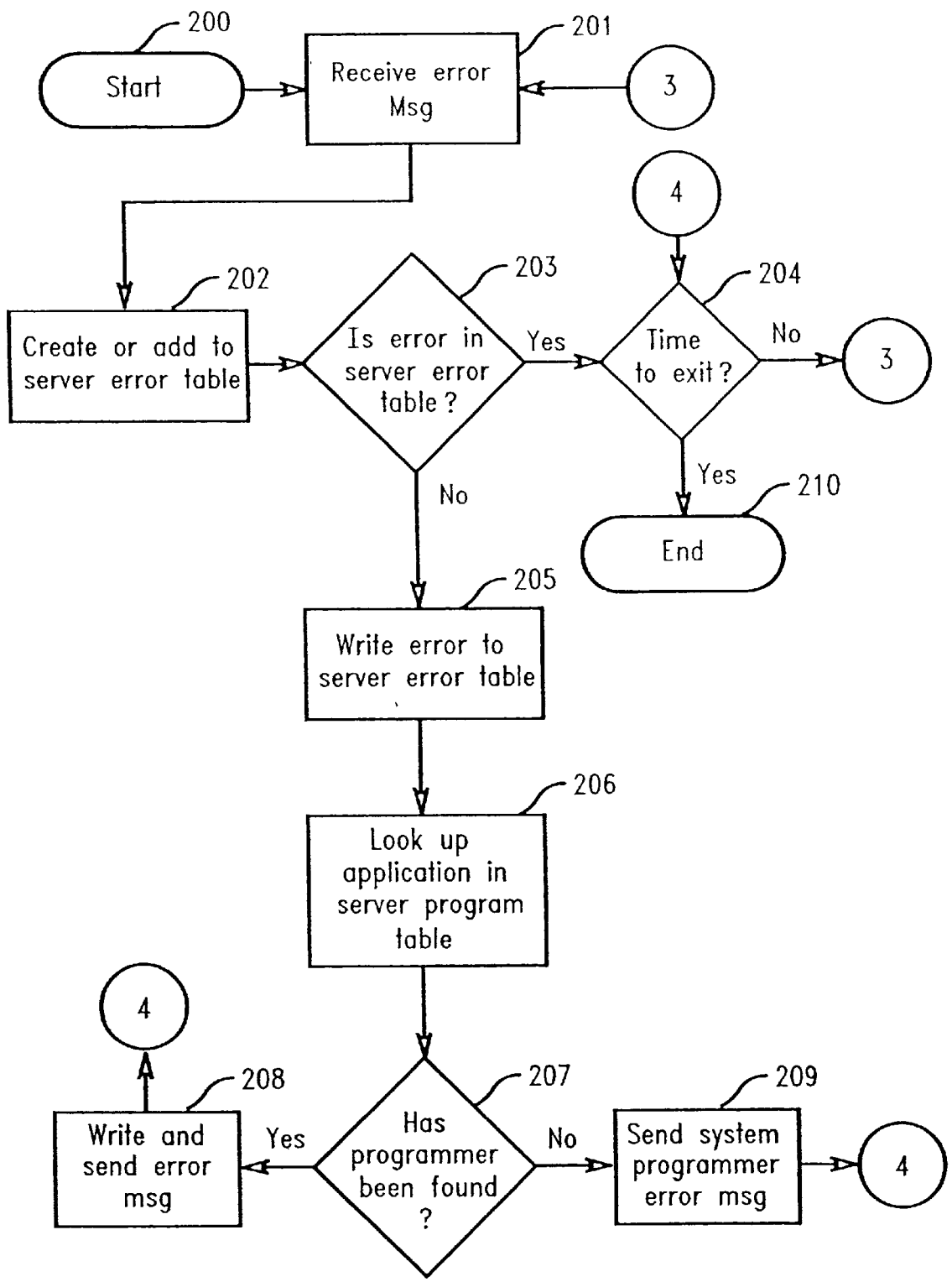
FIG. 3 is a flow diagram depicting the method steps of the present invention at the server interface.

Once the error message containing the error notification has been sent by user computer 10 via e-mail, the server level processing of the present invention 200 begins as illustrated in FIG. 3. The server 20 receives the error message 201. A server error table is created 202, as shown in FIG. 5, comprising of entries for the application name, the error number, and the error message.

The present invention determines at step 203 whether or not the error message has been previously sent by any user and previously received by the server. If the error message has an entry in the server error table, the process may be exited 204 and the server goes on to receive another error message 201. However, if the error message is unique and has never been sent by any user to the server 20 on a prior occasion, the error is written 205 to the server error table. A server program table, as illustrated in FIG. 6, created by the system administrator is located on the server. When the present invention is installed on a server, the system administrator enters the application name and the programmer e-mail address for each application into the server program table. The server 20 searches 206 for the application in the server program table to determine the e-mail address of the programmer. Step 207 determines whether the programmer has been found in the program table. If the e-mail address for the programmer has been located an error message is written and sent 208 to the programmer computer 25 and the process is terminated 204. The error message may comprise the application name, the error number, and the error message description to the programmer. However, if a programmer has not been located in the server program table, a message will be sent to the server administrator or system programmer indicating the application name, the error number, and an error message apprising the server administrator or system programmer that there is no programmer identified for the application in the server program table.

Therefore, at the server level processing, error messages are further filtered out and only those errors which have occurred for the first time are forwarded to the programmer. The programmer does not receive duplicate messages relating to the same error and can use the feedback provided by the present invention to correct the application in subsequent versions.

A preferred implementation of the present invention is as a computer program product used in conjunction with a web browser incorporating known program source code as a "plug-in" containing the means for providing feedback to the programmer of application errors encountered by users while not inundating the programmer with multiple error messages. Typical web browsers may be NETSCAPE NAVIGATOR™ available from Netscape Communications Corp. or INTERNET EXPLORER™ available from Microsoft Corp. Since many versions of web browsers are used by numerous users, the present invention provides a means for determining whether the application can be run using the version of the web browser stored on the user computer. If the application cannot be run using the version of the web browser on the user computer, feedback is not provided to the programmer since this is not a programming error. Most preferably, the present invention is a computer program product incorporating known source code containing the means for providing feedback to the programmer of application errors stored on a server accessible to users who can download the application onto their user computers.

The present invention achieves the objects recited above by providing a method and apparatus for providing only significant feedback to a programmer regarding programming errors encountered by the end user. Error messages are filtered at the user computer level and at the server level such that the programmer will receive error messages for a particular programming error only once. The programmer is not inundated with multiple error messages relating to the same error by multiple users. This is particularly useful to a programmer of a web based application that may have thousands of users a day. By receiving such feedback on programming errors, a programmer is able to correct the application in later versions and specifically address errors encountered by the user.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of notifying a programmer of an application error while running an application developed by the programmer, the application being stored on a user computer connected to a server on a network, the method comprising the steps of:

(a) detecting an error while running an application;

(b) determining whether the error has previously occurred while running said application;

(c) sending an error message without user input to a server responsible for collecting error messages if said error has not previously occurred, said error message notifying the programmer of said application of said error;

(d) receiving said error message by the server;

(e) determining whether said error is recorded in a server error table stored on the server; and (f) sending an error message to the programmer if said error is not found in said server error table, said error message notifying the programmer of said error.

2. The method of claim 1 further including the step of creating a user error table and wherein step (b) further comprises determining whether said error has been recorded in said user error table.

3. The method of claim 2 wherein the step of creating a user error table comprises creating a user error table having an application name, an identifier for said error, an error message, and a programmer e-mail address.

4. The method of claim 2 wherein upon determining that said error has been recorded in said user error table, said error message is not sent to the programmer.

5. The method of claim 1 wherein during step (e) if said error is recorded in said server error table, said error message is not sent to the programmer.

6. A method of notifying a programmer of an application error while a user is viewing a web application developed by the programmer on a user computer using a web browser linked to a server, said method comprising the steps of:
    (a) determining whether the web browser and the web application are compatible;
    (b) determining whether an error has previously occurred while viewing the web application; and
    (c) upon determining that said error has not previously occurred, sending an error message to the programmer via the server without user input to notify the programmer of said error.

7. The method of claim 6 wherein in step (a) if the web browser and the web application are incompatible, an error message will not be generated.

8. The method of claim 6 further including the step of creating a user error table comprising a web application name, an error message, and an e-mail address for the programmer of the web application.

9. The method of claim 8 wherein step (b) further includes the step of determining whether said error has been recorded in said user error table and, if said error has not been recorded, then continuing to step (c).

10. The method of claim 6 wherein during step (c) said error message is sent to a server having a server error table for logging and filtering error messages.

11. The method of claim 10 further including the step of determining whether said error message was previously recorded in said server error table, and if said error message is not recorded in said server error table, said error message is forwarded to the programmer.

12. The method of claim 11 further including the step of determining whether said error message was previously recorded in said server error table, and if said error message is recorded in said server error table, said error message is not sent to the programmer.

13. The method of claim 6 further including the step of receiving an error message by the programmer regarding an application error wherein subsequent error messages have been filtered out by the user computer and the server such that duplicate error messages are not sent to the programmer.

14. The method of claim 6 further including the step of sending said error message to a system programmer for the server if there is no programmer indicated in the user error table.

15. The method of claim 6 further including the step of searching a program table stored on the server comprising an application name and a programmer of the application, said program table created by a system programmer and wherein in step (c) an e-mail address for the programmer is obtained from said program table such that an error message may be sent to the programmer.

16. A feedback system for alerting a programmer of an application error when a user is accessing a web application written by the programmer using a web browser, the system to perform the steps of:
    (a) determining whether an application error has previously occurred;
    (b) creating an error table stored on the user's computer;
    (c) searching said error table for said application error;
    (d) sending an error message corresponding to said application error to a server which collects e-mail for the programmer if said application error is not found in said error table;
    (e) creating a server error table stored on the server which collects e-mail for the programmer;
    (f) searching said server error table for said error message corresponding to said application error; and
    (g) forwarding said error message corresponding to said application error to said programmer when said error message is not found in said server error table.

17. The system of claim 16 wherein step (b) comprises creating an error table comprising entries for the web application, an error number, an error message, and an e-mail address of the server.

18. The system of claim 16 wherein step (e) comprises creating a server error table comprising entries for the web application, an error number, and an error message.

19. The system of claim 16 wherein in step (g) said error message has been filtered by the user computer and the server which collects e-mail for the programmer such that the programmer does not receive multiple error messages relating to a same application error encountered by numerous different users.

20. A web browser stored on a user computer for accessing and browsing web applications, said user computer having stored thereon a user error table which tracks errors that occur while browsing a web application, said web browser comprising
    means for determining whether a web application error has occurred;
    means for creating an entry in said user error table corresponding to said web application error;
    means for searching said user error table to determine whether said web application error exists in said user error table prior to notifying the programmer of said web application error; and
    means for sending an error message to a server which collects e-mail for the programmer to notify the programmer of said web application error, said server having a server error table and a means for searching said server error table for said error message such that the programmer does not receive multiple error messages related to said web application error if said web application error exists in said server error table.

21. A server within a network of user computers, each user computer capable of accessing an application written by a programmer and stored on the server, said server capable of logging and filtering application error messages for sending to the programmer to notify the programmer of application errors, comprising
    means for creating a server error table, said server error table stored on a memory storage of the server;
    means for creating and writing to a user error table on a user computer, said user error table comprising entries corresponding to the application written by the programmer, an error message and an address of the server;
    means for determining whether an application error has occurred;
    means for determining whether an entry for an application error exists in the user error table;

means for sending an error message by the user computer to the server regarding the application error, said error message sent without input from a user of the user computer;

means for receiving said error message;

means for determining whether said error message exists in said server error table; and means for sending an e-mail to the programmer if said error message is absent from said server error table.

22. A program storage device readable by a machine, tangibly embodying a program of instructions executable by the machine to perform method steps for a method of notifying a programmer of an application error while running an application developed by the programmer, the application being stored on a user computer connected to a server on a network, said method steps comprising:

(a) detecting an error while running an application;

(b) determining whether said error has previously occurred while running said application;

(c) sending an error message without user input to a server responsible for collecting error messages if said error has not previously occurred, said error message notifying the programmer of said application of said error;

(d) receiving said error message by the server;

(e) determining whether said error is recorded in a server error table stored on the server; and (f) sending an error message to the programmer if said error is not found on said server error table, said error message notifying the programmer of said error.

23. A program storage device readable by a machine, tangibly embodying a program of instructions executable by the machine to perform method steps for a method of providing feedback to a programmer regarding application errors while an application is running on a user computer linked to a server or network, said method steps comprising:

(a) creating a user error table stored on the user computer, said user error table containing entries for the application name, an error number, an error message, and a programmer's server e-mail address;

(b) determining whether an application error has previously occurred by searching said user error table;

(c) sending an e-mail to the programmer's server with an error message corresponding to the application error without input from a user of the user computer, the programmer's server having a server error table containing entries comprising the application name, an error number, and the error message;

(d) receiving, by the programmer's server, the e-mail sent from the user computer;

(e) determining whether the error message exists in the server error table; and (f) sending an e-mail to the programmer only if the error message did not exist in the server error table to apprise the programmer of the application error.

24. A computer program product comprising:

a computer usable medium having computer readable program code means embedded therein for providing feedback to a programmer of an application regarding application errors, the computer readable program code means in said computer program product comprising:

computer readable program code means for causing a computer to detect an error while running said application;

computer readable program code means for causing a computer to determine whether the error has previously occurred while running said application;

computer readable program code means for causing a computer to send an error message without input from a user of said application to a server responsible for collecting e-mail for the programmer if said error has not previously occurred, said error message notifying the programmer of said application of said error;

computer readable program code means for causing a computer to receive said e-mail by the server;

computer readable program code means for causing a computer to determine whether said error is recorded in a server error table stored on the server; and computer readable program code means for causing a computer to send an e-mail to the programmer if said error is not found on said server error table, said error message notifying the programmer of said error.

25. A computer program product comprising:

a computer usable medium having computer readable program code means embedded therein for causing application errors to be logged and filtered such that a programmer of an application obtains feedback regarding the application errors, the computer readable program code means in said computer program product comprising:

computer readable program code means for causing a computer to create a user error table stored on the user computer, said user error table containing entries for applications stored on the user computer, an error number, an error message, and a programmer's server e-mail address;

computer readable program code means for causing a computer to determine whether an application error has previously occurred by searching said user error table;

computer readable program code means for causing a computer to send an e-mail to the programmer's server with an error message corresponding to the application error without input from a user of the user computer, the programmer's server having a server error table containing entries comprising an application name, an error number, and the error message;

computer readable program code means for causing a computer to receive, by the programmer's server, the e-mail sent from the user computer;

computer readable program code means for causing a computer to determine whether the error message has been previously received by the programmer's server; and computer readable program code means for causing a computer to send an e-mail to the programmer only if the error message was not previously received by the programmer's server to apprise the programmer of the application error.

* * * * *